United States Patent [19]

Sellers

[11] 4,154,436

[45] May 15, 1979

[54] WALL COMPONENT FABRICATING JIG

[76] Inventor: LeRoy Sellers, P.O. Box 376, Dallas, N.C. 28034

[21] Appl. No.: 823,330

[22] Filed: Aug. 10, 1977

[51] Int. Cl.[2] ............ B23P 19/00

[52] U.S. Cl. ............ 269/321 F

[58] Field of Search ............ 269/321 F, 296–299; 100/DIG. 13

[56] References Cited

U.S. PATENT DOCUMENTS

| | | | |
|---|---|---|---|
| 2,884,967 | 5/1959 | Le Vay | 269/321 F |
| 3,100,301 | 8/1963 | Black | 269/321 F |
| 3,933,348 | 1/1976 | Tidwell | 269/321 F X |

*Primary Examiner*—Robert C. Watson
*Attorney, Agent, or Firm*—Lawrence E. Laubscher

[57] ABSTRACT

A fabricating jig for building components is disclosed, including a horizontal frame, a pair of longitudinally extending stop plates connected with the frame for relative transverse parallel displacement toward and away from each other, and a device for displacing the stop plates together, whereby structural components arranged therebetween are pressed together and are held firmly in place during the fastening of the components to form a building unit. Stud supports are connected with the frame between the plates for supporting structural components that extend transversely between longitudinal components which are in contiguous engagement with the stop plates, respectively. Preferably the stud supports are longitudinally adjustable relative to the frame. An elevating device may be provided for raising the assembled building unit from the frame.

4 Claims, 12 Drawing Figures

WALL COMPONENT FABRICATING JIG

The invention relates to wall component fabricating jigs and more particularly to jigs with assembly fixtures which holds studs and components in proper spacing and alignment based on numerical modular grid designations.

BRIEF DESCRIPTION OF THE PRIOR ART

It is well known in the patented prior art to provide jigs and tables for constructing building frames and the like from wooden studs, as evidenced, for example, by the patents to LeVay U.S. Pat. Nos. 2,662,565 and 2,884,967, Zeinetz No. 3,581,367, Kunkle No. 3,641,645, Jureit et al No. 3,685,129, Valente No. 3,789,489, and Kellner et al No. 3,986,247.

SUMMARY OF THE INVENTION

An object of the invention is to provide an improved wall component jig which is of simple construction and may be readily and economically fabricated and assembled on a mass production basis. The jig is sturdy and durable, and is capable of a long service life over severe periods of usage. The jig can be employed to fabricate single studs and the sub-components which they make up into wall sections not limited to wood or any other specific material or composition. The said jig which may be either a mobile or stationary machine not limited to any particular length.

A more specific object of the invention is to produce a fabricating jig which uses a typical 4-inch module as the basis in locating pre-cut components at pre-determined linear numerical designations on the modular grid of the jig.

Another object of the invention is to produce a fabricating jig which uses the 100 millimeter "module" as the basis in locating pre-cut components at pre-determined metric designations on the modular grid of the jig.

It is a further object of my invention to produce an erector machine whereby sub-components and studs are laid in dimensional locations through the use of a numerical line tape placed on the assembly surface of the machine with component locations indicated by spec-sheet layout or shop drawings.

Another object of the invention is to produce a wall framing machine which holds all sub-assemblies in position on the assembly surface through the use of a computer locator tape which goes on the framing machine to create an actual template for panel members.

A further object of the invention is to produce an assembly machine which locates single studs and the sub-components which they make up at pre-determined spots on the assembly surface as indicated by projected color slides of wall panels.

A still further object of the invention is to provide structural embodiments of the device which are readily constructed and permit efficient use and operation thereof.

BRIEF DESCRIPTION OF THE DRAWING

Other objects of the invention will in part be obvious and will in part appear hereinafter.

For a fuller understanding of the nature and objects of the invention, reference should be had to the following detailed description taken in connection with the accompanying drawings, in which.

DETAILED DESCRIPTION

Figure 1:
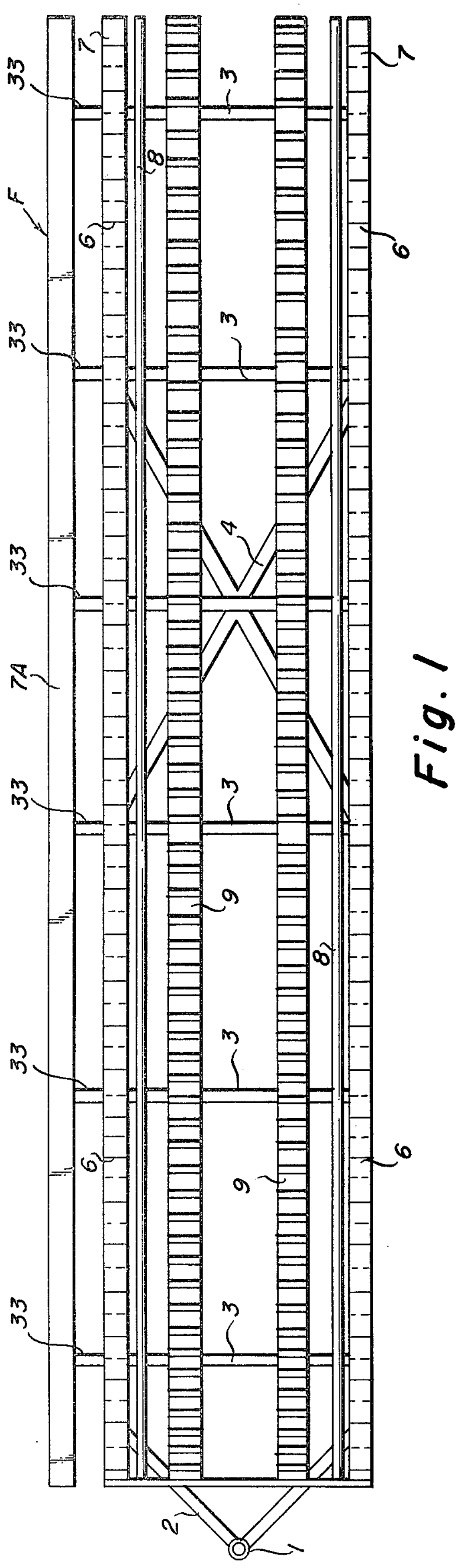
FIGS. 1–3 are top plan, left side elevation and right side elevation views, respectively, of a transportable embodiment of the invention.
Figure 2:
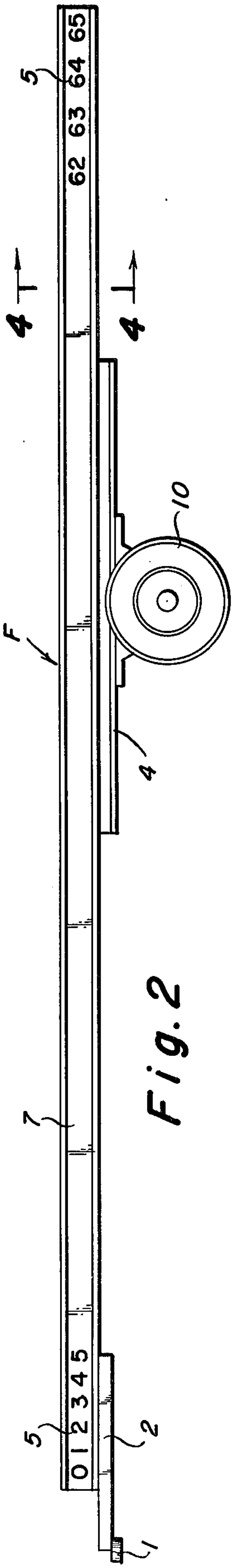
Figure 3:
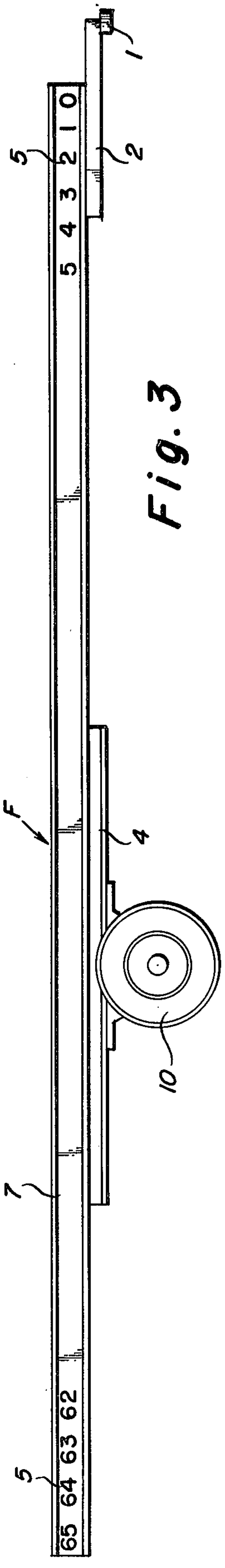

Referring first more particularly to FIGS. 1–3, the fabricating jig of the present invention includes a rigid horizontal frame F formed from longitudinal and transverse I-beams 7 and 3, respectively. In the illustrated embodiment, the frame is supported for transport by dolly 4 and the wheel means 10, a trailer hitch 1 and A-frame 2 being provided at the forward end of the frame. Preferably the longitudinal and transverse I-beam members have flanges of 4 inches and 2½ inches, respectively. The upper flange surfaces of the longitudinal I-beams 7 are provided with bracket index indicia 6, and the sides of the web portions of the longitudinal I-beams are provided with grid increment indicia 5 originating from the forward end of the frame.

Figure 4:
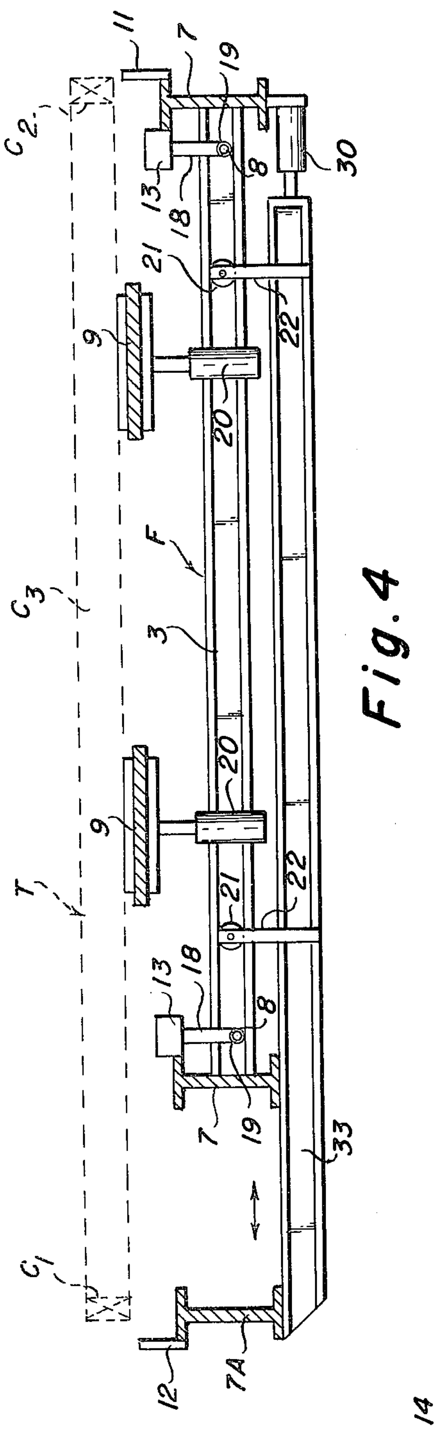
FIG. 4 is a sectional view taken along line 4—4 of FIG. 2.

As shown in FIGS. 1 and 4, an auxiliary longitudinal frame member 7A is provided adjacent one side edge of the frame, the auxiliary member being connected for lateral displacement relative to the frame (as indicated by the arrow in FIG. 4). More particularly, connected at one end with auxiliary longitudinal member 7A are a plurality of transverse auxiliary members 33 that extend beneath the frame, said auxiliary members 33 being suspended from the lower flange portion of the transverse frame members 3 by means of rollers 21 and suspension straps 22, thereby to permit linear displacement of the auxiliary members 33 transversely of the frame.

Figure 8:
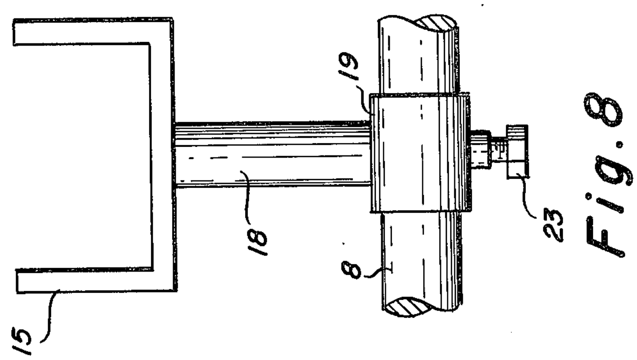
FIGS. 7 and 8 are end and side elevation views, respectively, of a double stud holding bracket.
Figure 7:
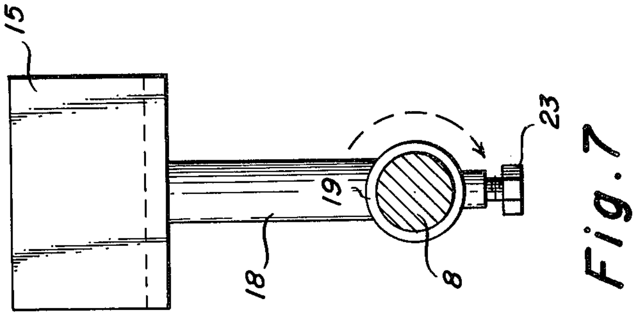
Figure 6:
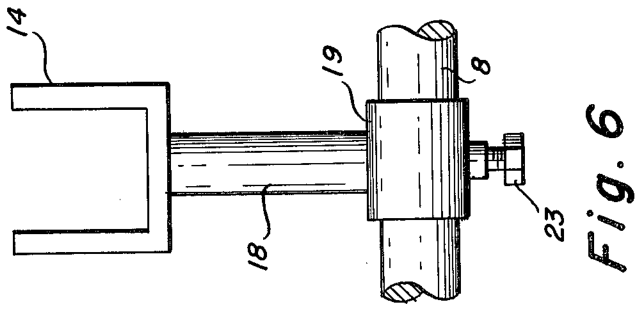
FIGS. 5 and 6 are end and side elevation views, respectively, of a single stud support bracket.
Figure 5:
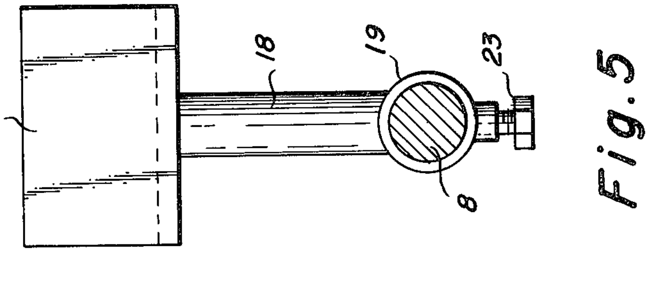
Figure 9:
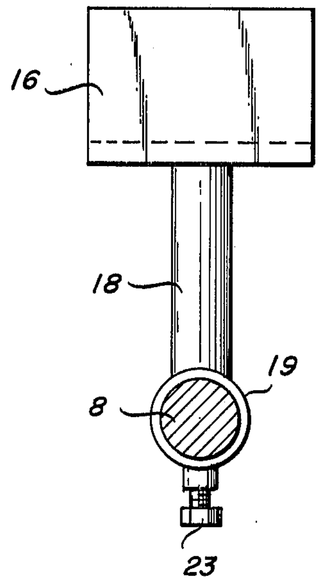
FIGS. 9 and 10 are end and side elevation views, respectively, of a corner post support bracket.
Figure 10:
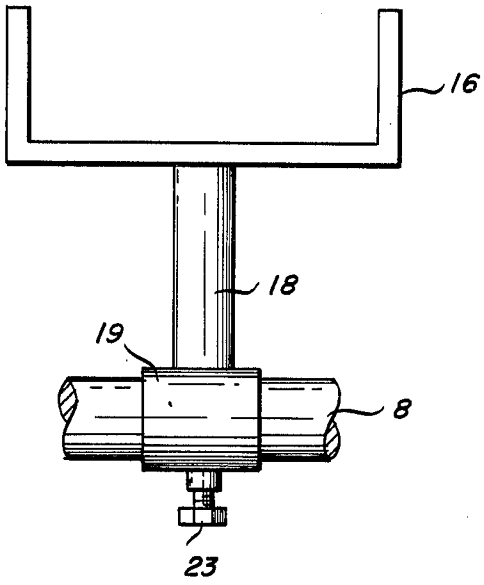
Figure 11:
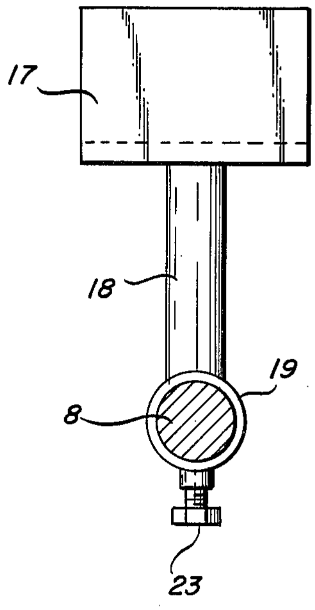
FIGS. 11 and 12 are end and side elevation views, respectively, of a T-post support bracket.
Figure 12:
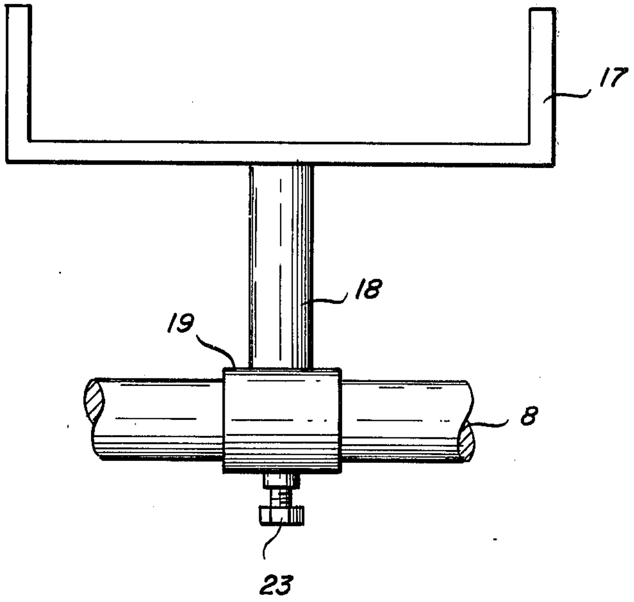

Extending upwardly in parallel spaced relation from the remote outer side edges of the auxiliary longitudinal frame member 7A and the remote longitudinal frame member 7 are upwardly extending top and bottom vertical stop plates 12 and 11, respectively, which stop plates are parallel with the longitudinal axis of the frame. Arranged between these stop plates are upwardly extending stud support brackets 13 which are connected for displacement longitudinally of the frame F. More particularly, each stud support bracket 13 is connected with the upper end of a spacer arm 18 the lower end of which is secured to a rider sleeve 19 mounted concentrically upon a guide shaft 8 that is connected with and extends longitudinally of the frame F. Set screw or bolt 23 secures the position of the stud support bracket relative to the longitudinal guide shaft. Furthermore, upon loosening of the set screw 23, the support bracket may be pivoted downwardly about the guide shaft 8 toward an inoperable retracted position relative to the frame. The support bracket means may be a single stud bracket 14 (as shown in FIGS. 5 and 6), a double stud bracket (as shown in FIGS. 7 and 8), a corner post support bracket (as shown in FIGS. 9 and 10), or a T-post support bracket (as shown in FIGS. 11 and 12).

As will be developed below, longitudinal structural stud components $C_1$ and $C_2$ (FIG. 4) are seated on the outermost longitudinal frame members in contiguous engagement with the adjacent surfaces of the top and bottom stop plates 12 and 11, respectively, and transverse components $C_3$ supported on the stud support brackets 13 extend transversely of the frame between the longitudinal components $C_1$ and $C_2$. Air cylinder motor 30 is then actuated to cause stop plates 11 and 12 to be displaced toward each other, thereby compressing the components together for the fastening thereof into a structural building unit or truss T. Air cylinder 30 is then operated to release the building unit, whereupon air cylinders 20 are operated to elevate the pair of roller conveyor means 9 that extend longitudinally of the frame, together with the assembled building unit T.

FIGS. 1, 2, and 3 show views of the wall component fabricating jig. In addition to the jig, equipment making the invention mobile is also included in the drawings such as the hitch 1 attached to the dismounting A-Frame 2. The dolly 4 is illustrated showing the wheel/hub/drum assembly 10. FIG. 1 illustrates the general construction of the jig in starting with the wide flange longitudinal I-Beams 7 connected by the smaller transverse beams or girders 3. These beams 7 may be any length with the 8″ grid increment indicia 5 indicating the center of the bracket indexes 6 in numerical progression. The spacer shafts 8 extend longitudinally of the frame for supporting the axially adjustable rider sleeves 19 which in turn support the stud supports 13. The rider sleeves may be rotated through 180° as shown to lower the stud supports from the operable vertical position to a downwardly directed inoperable retracted position within the frame. The rider sleeves are adjustable for alignment with the bracket index 6 is also shown. The roller conveyor 9 is elevated as a result of the pressure from air cylinders 20 of FIG. 4, thereby providing means for removing the assembled unit T from the frame.

Of special note in FIG. 2 is the diagrammatic numerical indicia 5 on the left side or bottom plate side of the I-Beam 7. These numerals 5 must be sized in 4″ multiples: 16″, 24″, 4′-0″, 10′-8″, 24′-0″, etc. The selection of the basic grid may be almost any convenient multiple size. The basic 4″ module was adopted by the American Standards Association after careful study, as being the most convenient unit from which major materials could be sized and construction features could be dimensioned. The basic module is also compatible with sizing of products from countries using the metric system. The 100 millimeter "module" comes close to the widely used 4-inch module and would mean only a slight variation (somewhat smaller) in 2×4 studs, 4×8 panels, etc. For example, a 4×8 - foot plywood panel, converted to the 100 mm module, would come out 1200×2400 mm. A "soft" conversion (merely retaining the original size transposed in metric units) would come out something like 1238×2470 mm.

Each numeral whether read from left to right FIG. 2 No. 5 or from right to left FIG. 3 No. 5 represents an 8″ increment. Each 8″ increment is given a number of numerical sequence beginning with 0. The numbers on the grid would read 0, 1, 2, 3, 4, 5, etc. with 16″ being the distance between any two like numbers (odd or even) in numerical progression, whether the measure be to the next high or to the next low number. This makes it possible to place the studs either 16″ on center or 24″ on center. Most structures today use 16″ stud pacing in the rooms where paneling is used, and 24″ stud spacing in the rooms where dry wall is used. By using 8″ multiples however, almost any stud spacing may be used.

Greater stud spacings most likely will be used if they are made of steel, aluminum, copper, plastic, or any of the present day substitute materials for wood.

FIG. 4 shows a front end sectional view of the fabricator. The top surface of the longitudinal I-beams 7 are illustrated forming the horizontal assembly surface. These beams and the transverse I-beams 3 make up the basic structure of the machine. Attached to the edge of one I-Beam 7 is a bottom plate stop 11, and to the auxiliary beam 7A, a top plate stop 12. The stops hold the components in place while they are being fastened through the use of cylinders 30 applying pressure to the auxiliary transverse girder beams 33 mounted by a combination of rollers 21 and hangers 22. The rotation of the holding brackets 13 into working position on the spacer shaft 8 made possible by the rider sleeve 19 which is connected to the holding bracket 13 by the spacer arm 18. The cylinders 20 attached to the girder I-Beams 3 which raise the conveyors 9 releasing the components from their racked position are illustrated.

FIGS. 5, 6, 9 and 10 all illustrate end section views of the different holding brackets. As may be observed the end section views are the same for these brackets. Number 14 is a single stud holding bracket; Number 15 is a double stud holding bracket; Number 16 is a corner post holding bracket; and Number 17 is a T-Post holding bracket. The different parts of the holding brackets making them functional are shown. These parts are the spacer arm 18, the rider 19, the spacer shaft 8 and the lock bolt 23. The lock bolt 23 tightens on the spacer shaft 8 after the holding bracket 13 has been placed at a dimensioned location.

FIGS. 7, 8, 11 and 12 show side sections of the different holding brackets. The different size openings which hold the components in parallel position may be observed. Number 14 is a single stud holding bracket, number 15 is a double stud holding bracket, number 16 is a corner post holding bracket, and number 17 is a T-Post holding bracket. In each figure the rider 19 is shown attached to the spacer shaft 8 upon which the rider both slides and revolves to predetermined locations on the assembly surface.

FIGS. 13, 14, 15 and 16 show diagrammatic views of the bracket index 6 on the assembly surface 7 and the alignment of the different holding brackets with the bracket index 6. The bracket index 6 is illustratd by a top view while the holding bracket is illustrated by a side view in order to show their alignment. FIG. 13 shows the alignment for a single stud, FIG. 14 for a double stud, FIG. 15 for a corner post, and FIG. 16 for a T-Post.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A jig for assembling a plurality of structural components into a building unit, comprising (a) a rigid horizontal generally rectangular frame;

(b) a pair of spaced vertical stop plates extending generally longitudinally above, and connected for relative adjustment generally laterally of, said frame, said stop plates being adapted to support therebetween components that extend generally longitudinally of the frame;

(c) a plurality of stud support brackets arranged between said stop plates for supporting components that extend generally transversely of the frame;

(d) means connecting said stud support brackets with said frame, at least a first group of said connecting means connecting the associated stud support brackets for both longitudinal and pivotal adjustment relative to said frame, said first connecting means including (1) longitudinal guide shaft means connected with said frame, and (2) rider sleeves connected with said stud support brackets, respectively, said rider sleeves being rotatably mounted concentrically on said guide shaft means for displacing said stud bracket means between retracted inoperable and vertically extending operable positions, respectively, relative to said frame; and (e) means for displacing said stop plates toward each other, thereby to hold the components together while they are being fastened to form the building unit.

2. A jig for assembling a plurality of structural components into a building unit, comprising:

(a) a rigid horizontal rectangular frame including transverse I-beam members;

(b) a pair of spaced vertical stop plates extending generally longitudinally above said frame;

(c) means connecting said plates with said frame for adjustment generally laterally thereof, said connecting means including (1) an auxiliary frame member arranged adjacent one side of said frame, and (2) means connecting said auxiliary frame member for lateral displacement relative to said frame, said stop plates being connected with said frame and with said auxiliary frame, respectively; and (3) means connecting said auxiliary frame member with said frame, including a plurality of auxiliary arms connected at one end with and extending normal to said auxiliary frame member, and roller and suspension strap means suspending said auxiliary arms in parallel axially displaceable relation from said transverse I-beam members.

3. Apparatus as defined in claim 2, and further including means operable when said stop plates are spaced apart in a building-unit-released position for elevating said building unit relative to said frame.

4. Apparatus as defined in claim 3, and further including longitudinally extending conveyor means for conveying the building unit, when in a released condition, longitudinally of said frame.

* * * * *